April 3, 1956  J. O. HICE ET AL  2,740,721
METHOD FOR PREPARING, FREEZING AND PACKING FROZEN SHRIMP
Filed Feb. 23, 1951  10 Sheets-Sheet 1
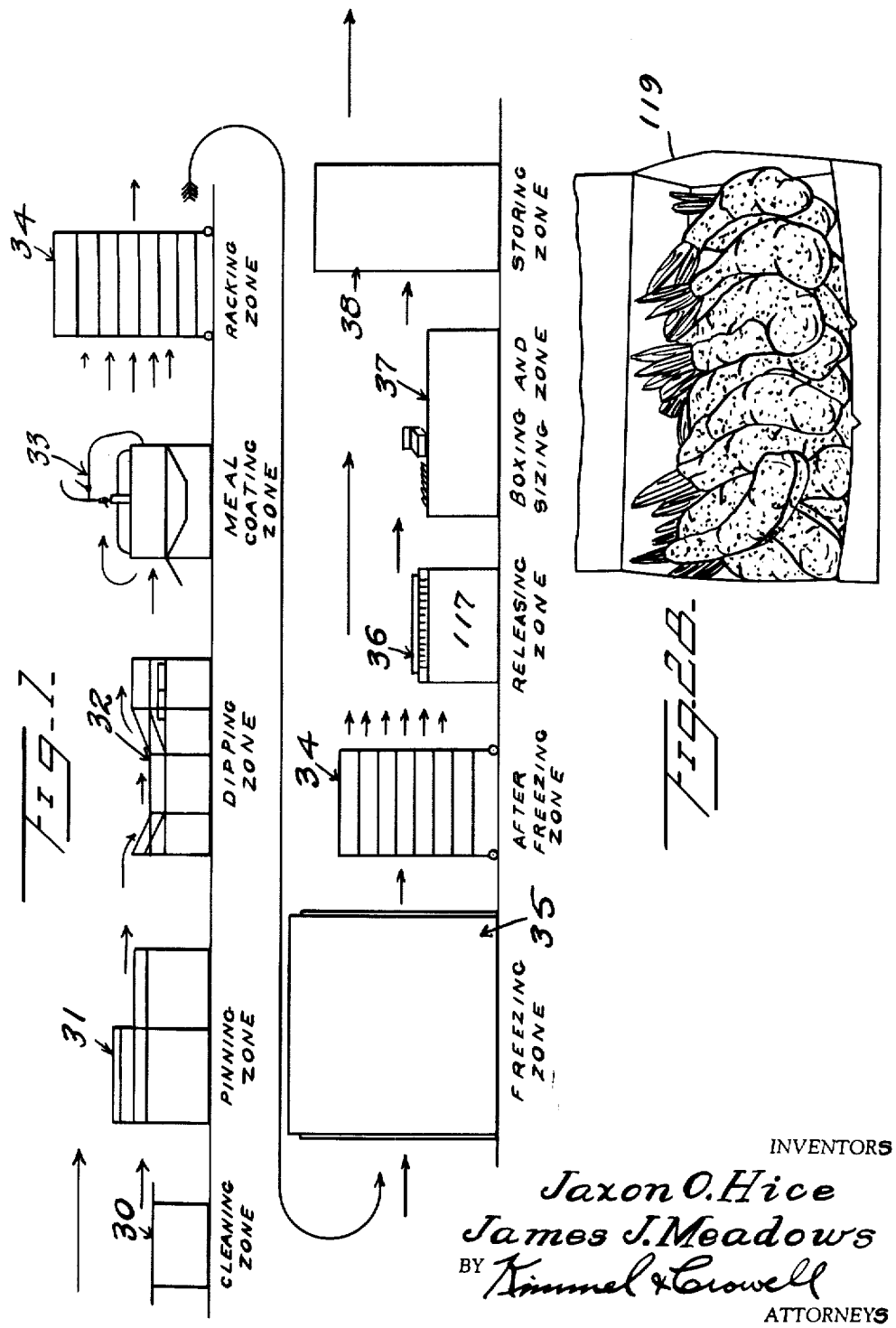
INVENTORS
Jaxon O. Hice
James J. Meadows
BY Kimmel & Crowell
ATTORNEYS

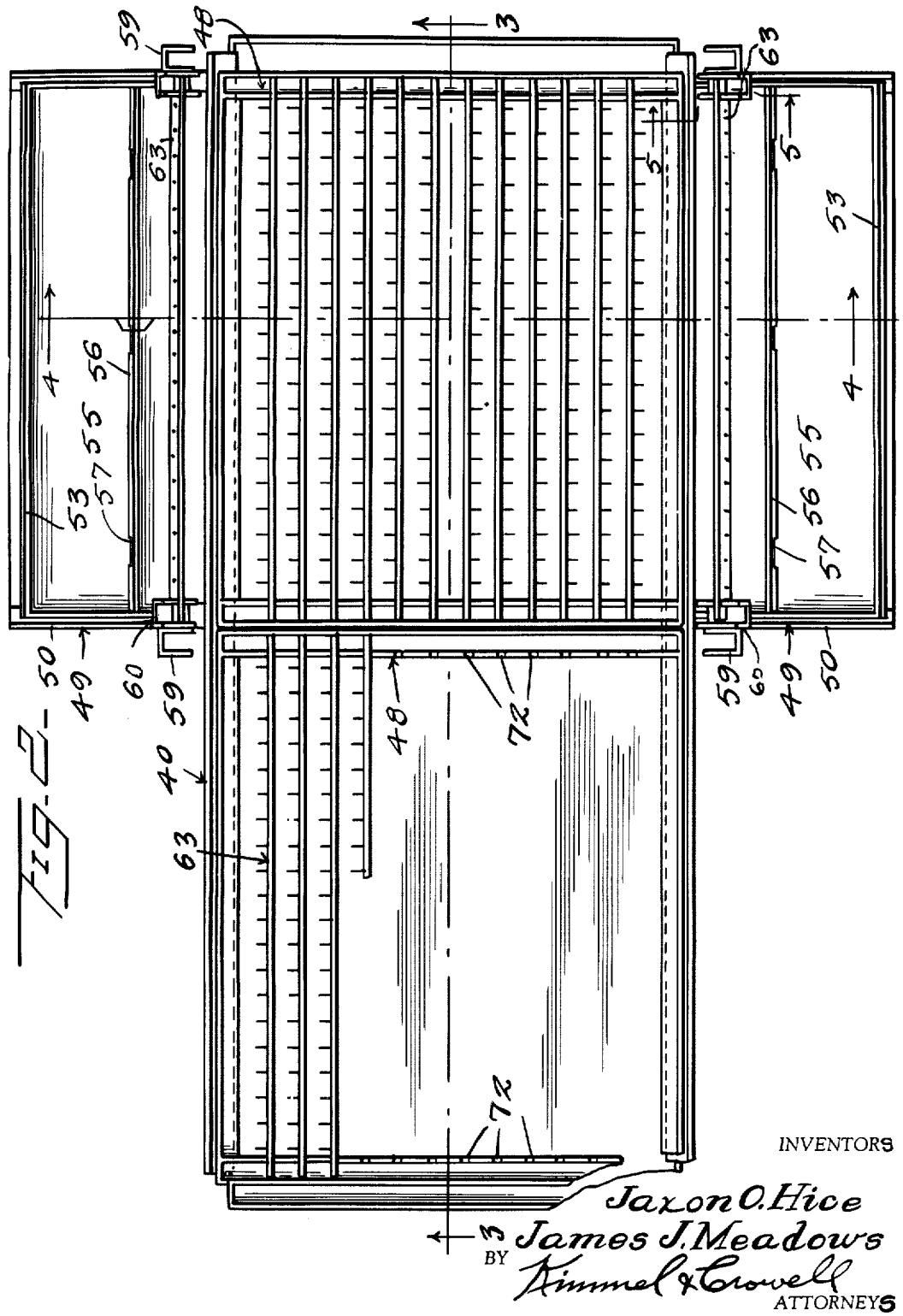

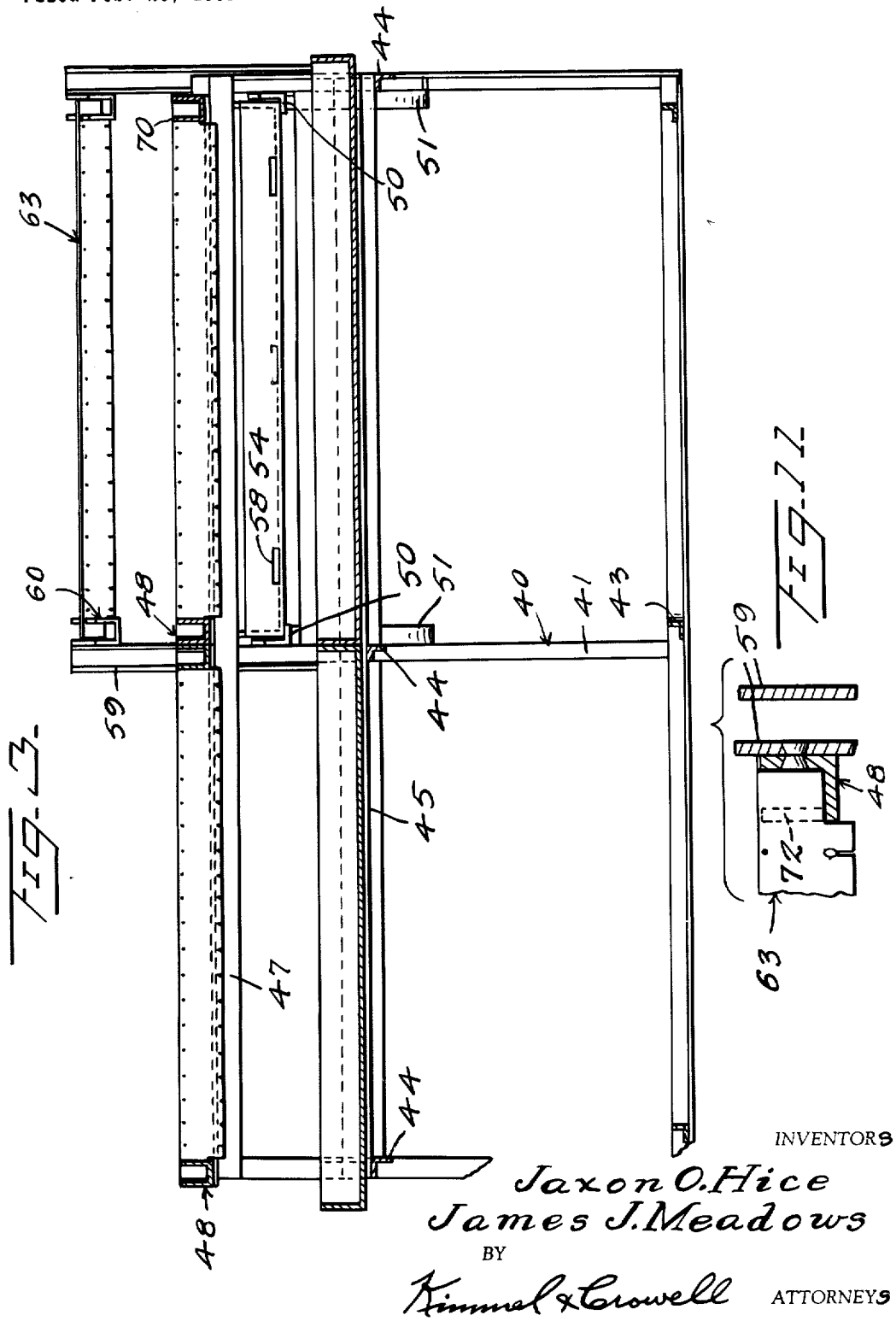

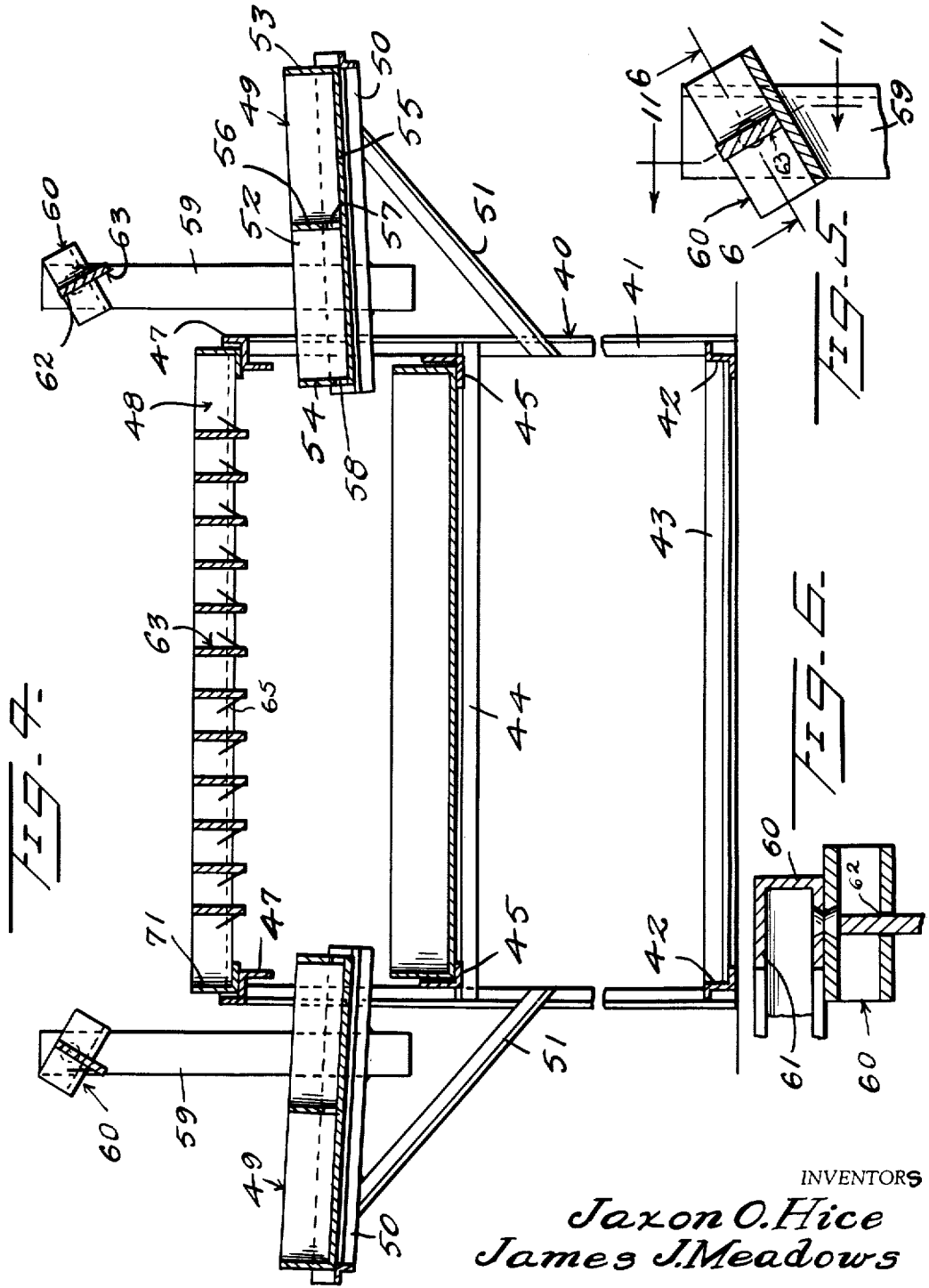

April 3, 1956    J. O. HICE ET AL    2,740,721
METHOD FOR PREPARING, FREEZING AND PACKING FROZEN SHRIMP
Filed Feb. 23, 1951    10 Sheets-Sheet 5
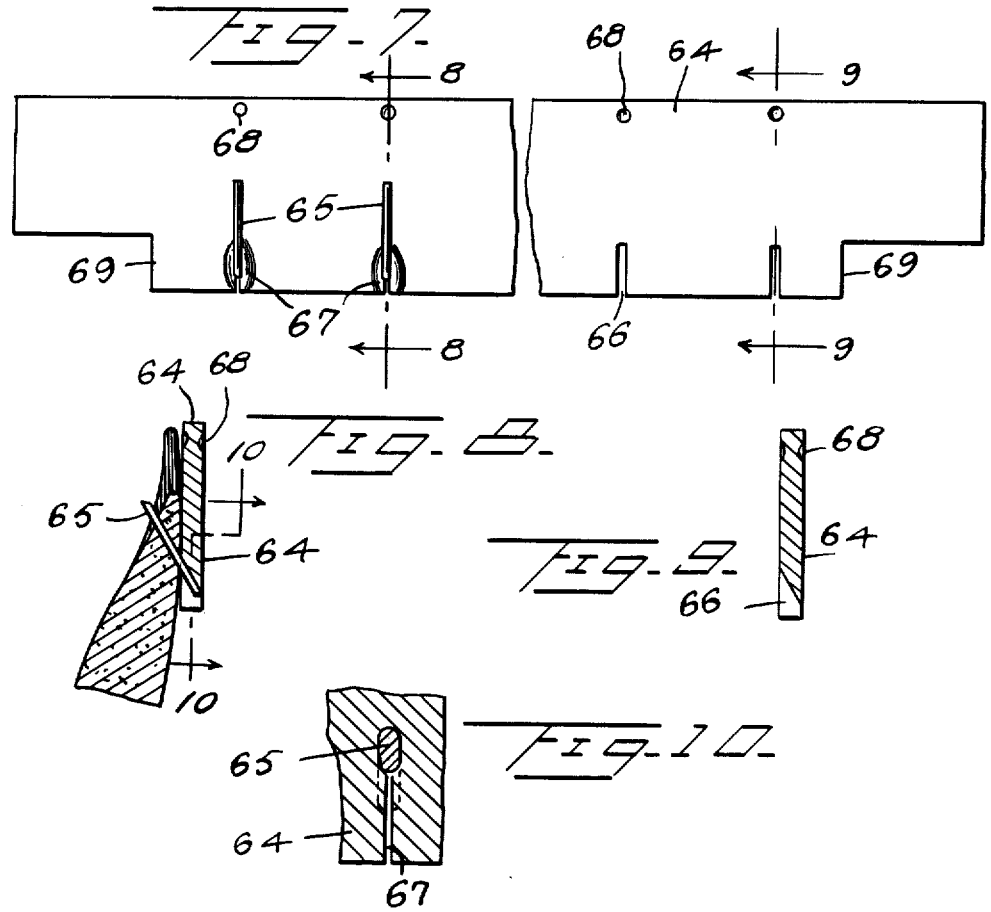
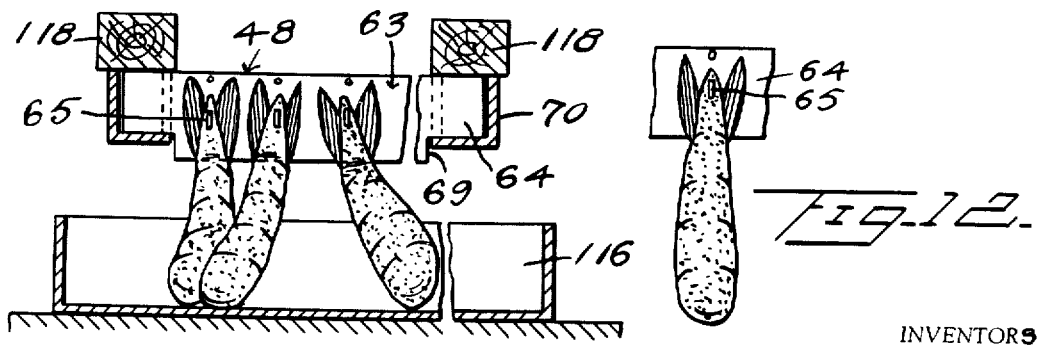
INVENTORS
Jaxon O. Hice
James J. Meadows
BY Kimmel & Crowell
ATTORNEYS

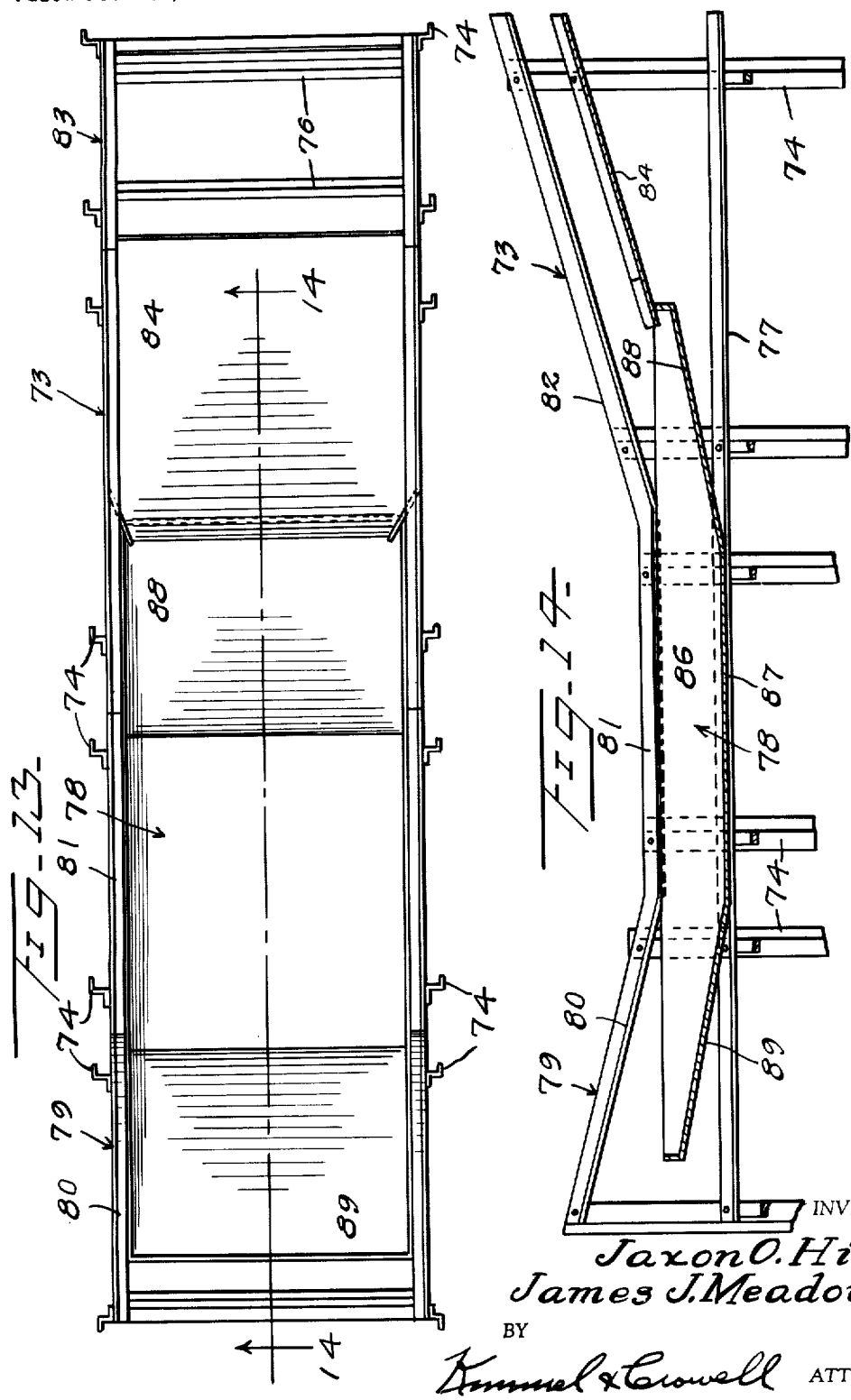

April 3, 1956  J. O. HICE ET AL  2,740,721
METHOD FOR PREPARING, FREEZING AND PACKING FROZEN SHRIMP
Filed Feb. 23, 1951  10 Sheets-Sheet 7
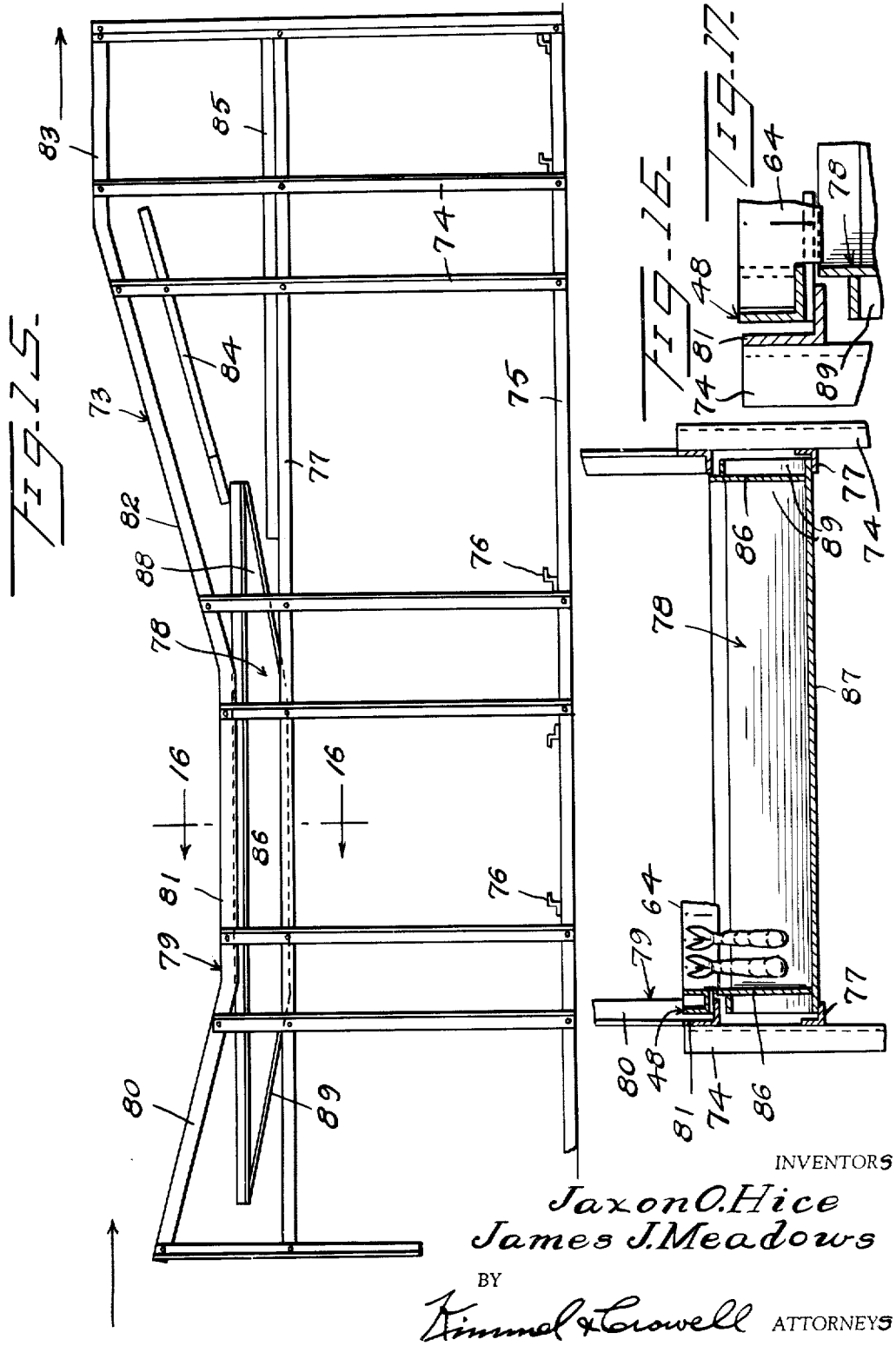
INVENTORS
Jaxon O. Hice
James J. Meadows
BY
Kimmel & Crowell ATTORNEYS

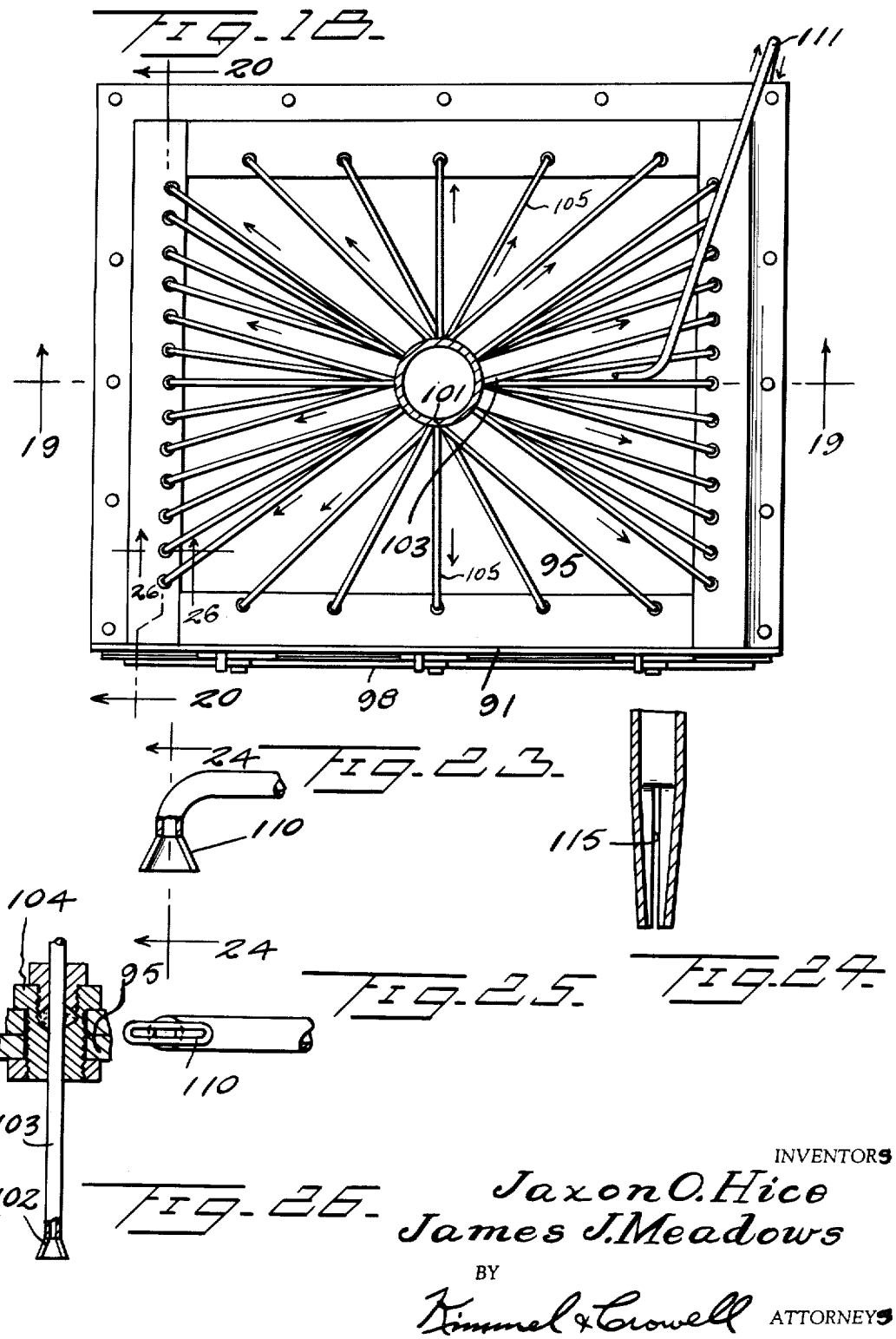

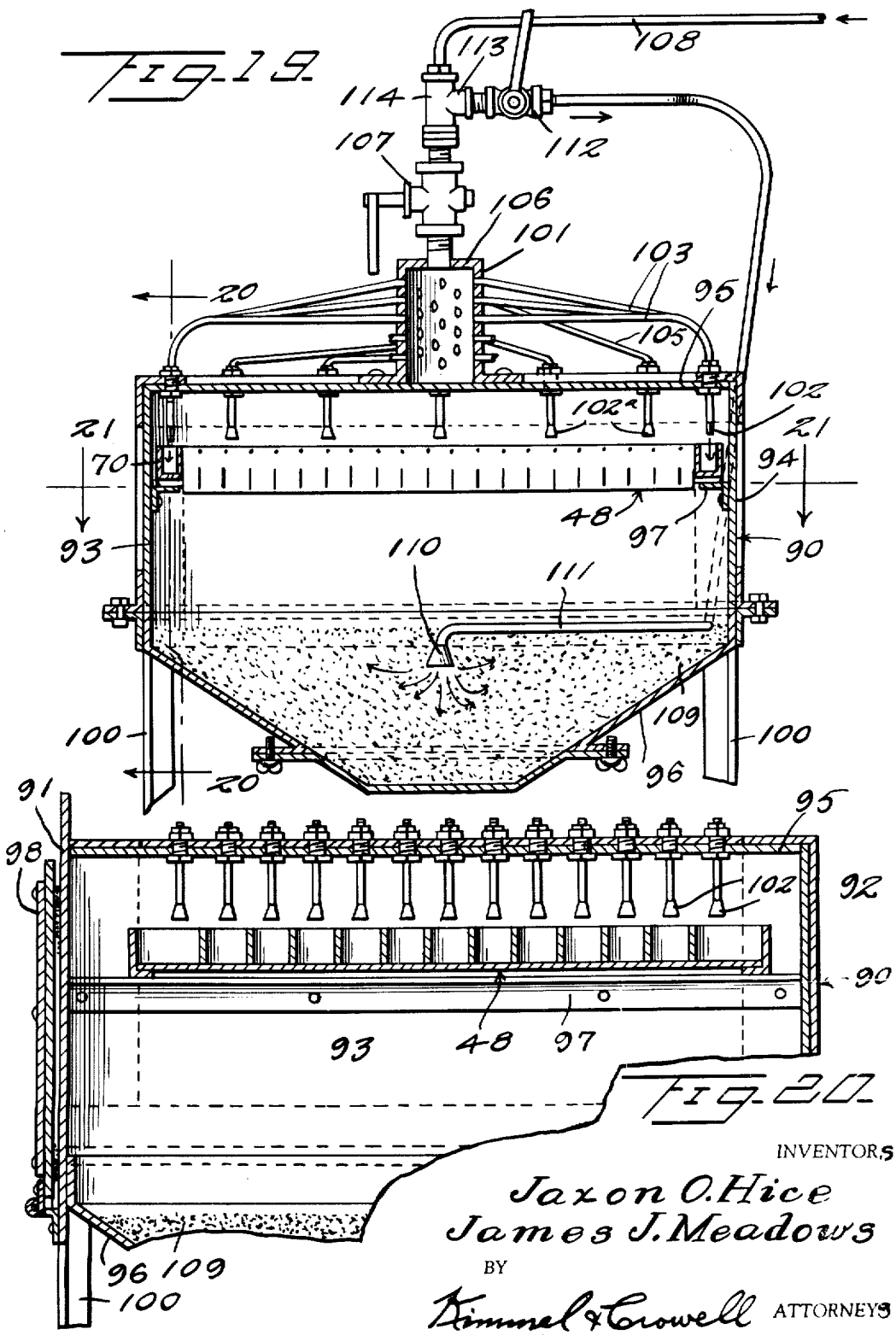

April 3, 1956   J. O. HICE ET AL   2,740,721
METHOD FOR PREPARING, FREEZING AND PACKING FROZEN SHRIMP
Filed Feb. 23, 1951   10 Sheets-Sheet 10
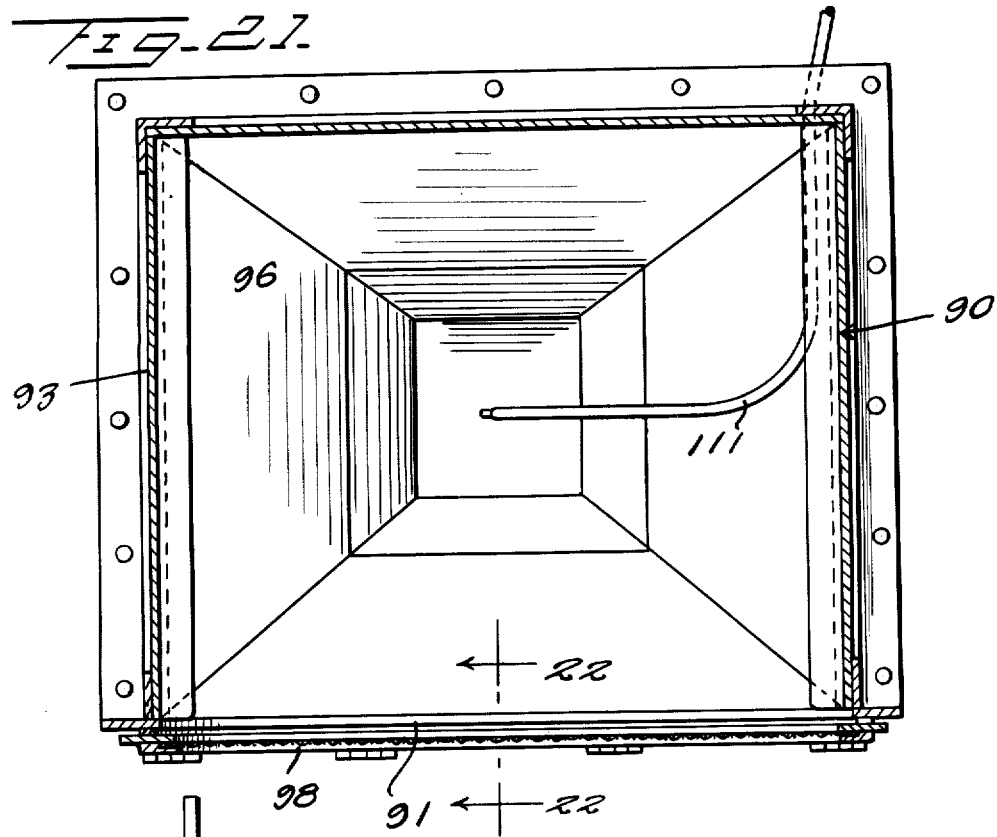
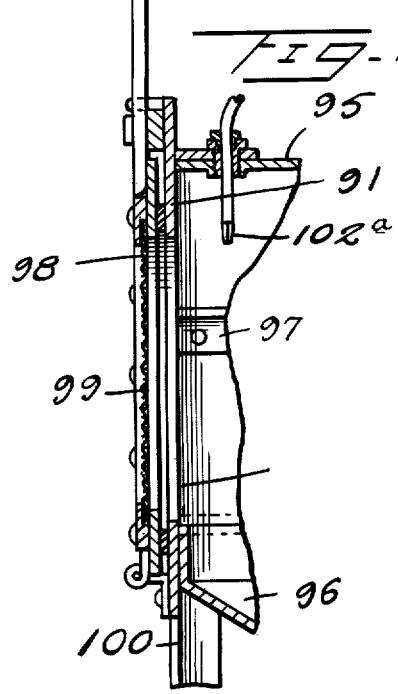
INVENTORS
Jaxon O. Hice
James J. Meadows
BY
Kimmel & Crowell ATTORNEYS

United States Patent Office 2,740,721
Patented Apr. 3, 1956

2,740,721

METHOD FOR PREPARING, FREEZING, AND PACKING FROZEN SHRIMP

Jaxon Odell Hice and James John Meadows, St. Simons Island, Ga., assignors to Seapak Corporation, St. Simons Island, Ga.

Application February 23, 1951, Serial No. 212,271

1 Claim. (Cl. 99—195)

This invention relates to an improved method and apparatus for preparing sea food.

It is an object of this invention to provide a method and apparatus which will eliminate the objectionable features of the known processes and produce an article which has what is known as "consumer appeal."

Another object of this invention is to produce an edible article of sea food wherein the articles are individually frozen and packed in the frozen state so that the articles upon being subsequently placed in a freezer storage will not freeze together. Under this method a partial pack may be cooked without disturbing the condition of the remainder of the pack.

Another object of this invention is to provide a method whereby in the cleaning and deveining of the shrimp, the natural shape of the shrimp is retained, and the bread coating is applied to only the body, with the tail uncoated and spread out fanwise to produce a consumer appeal factor.

A further object of this invention is to provide a method and apparatus which will greatly reduce the handling steps and eliminate the packing of broken pieces and odd sizes.

A further object of this invention is to provide a frozen article of sea food which may be cooked in its frozen condition, thereby retaining its orginal ocean-fresh taste.

A further object of this invention is to provide an improved rack structure which will permit the subsequent steps in the process to be performed without removal of the shrimp therefrom.

A further object of this invention is to provide an improved rack structure which will hold the shrimp in spaced apart and dependent position so as to speed up the subsequent steps in the process.

A further object of this invention is to provide an improved batter coating means whereby an adequate but not an excess amount of batter may be applied to the shrimp bodies without coating the fanned-out tails.

A further object of this inention is to provide an improved batter applying device which will conserve the batter.

A further object of this invention is to provide an improved method of and apparatus for applying a bread or cracker crumb coating on shrimps.

A further object of this invention is to provide a meal applying device which will evenly coat the shrimp and which will permit the regulation of the thickness of the meal coating.

A further object of this invention is to provide an improved freezing means whereby the coated shrimp may be solidly frozen very quickly so as to produce minute ice crystallization particles in the body of the shrimp and to retain therein the original flavor and fresh characteristics of the shrimp.

A further object of this invention is to provide an improved frozen food package wherein the individual frozen articles may be removed one at a time and immediately cooked, without prior thawing.

In the preparing of sea food, and as an example shrimp, under known processes, the shrimp are first headed, shelled and deveined. In the deveining step the body of the shrimp is split lengthwise, and in splitting the shrimp the cut is made quite deep so that the meat can be flattened out to create the impression of relatively large shrimp. The prepared shrimp are then placed in layers separated by paper sheets, and the packs are then placed in freezers. The freezing of the shrimp under such conditions causes the shrimp in each layer to freeze together, and in addition the layers also tend to freeze together.

In the customary process the cleaned, flattened shrimp are breaded before freezing. By flattening the shrimp there is presented to the breading step a greater surface area so that each shrimp is coated with an excess cracker or bread crumb coating which not only produces extra weight, but also produces extra bulk. The amount of extra weight and bulk will vary disproportionately and creates an undesirable consumer reaction.

Under prior breading processes the coating is lumpy and uneven, the lumps producing spotty excess coating which further creates an undesirable consumer reaction.

A further objectionable feature to the known processes is that in the separation step immediately prior to cooking, that is, the separation of the individual shrimp from a frozen pack, a substantial amount of the coating is broken, and the cooking of a partial pack is difficult for the reason that the whole pack might need to be partially thawed to remove even one layer.

Further objections to the present frozen pack lie in the fact that being initially in an unfrozen pack the freezing step requires from four to ten hours or more, and as time is a major factor in retaining the delicate flavors of the product, the palatability of the product is considerably reduced.

With the above and other objects in view, my invention consists in the arrangement, combination and details of construction disclosed in the drawings and specification, and then more particularly pointed out in the appended claims.

In the drawings:

Figure 1 is a diagrammatic view showing the method and apparatus embodied in this invention.

Figure 2 is a plan view of the apparatus used in the initial steps and comprises a pinning table or frame with pinning racks and bars removably mounted thereon.

Figure 3 is a sectional view partly broken away taken on the line 3—3 of Figure 2.

Figure 4 is a sectional view taken on the line 4—4 of Figure 2.

Figure 5 is a fragmentary sectional view taken on the line 5—5 of Figure 2.

Figure 6 is a fragmentary sectional view taken on the line 6—6 of Figure 5.

Figure 7 is a detailed side elevation partly broken away of one of the pinning strips or bars.

Figure 8 is a sectional view taken on the line 8—8 of Figure 7 showing a shrimp mounted on one of the supporting pins.

Figure 9 is a sectional view taken on the line 9—9 of Figure 7.

Figure 10 is a fragmentary sectional view taken on the line 10—10 of Figure 8.

Figure 11 is a fragmentary sectional view taken on the line 11—11 of Figure 5.

Figure 12 is a fragmentary side elevation of one of the pinning bars with a shrimp mounted thereon.

Figure 13 is a plan view of the batter applying structure.

Figure 14 is a fragmentary sectional view taken on the line 14—14 of Figure 13.

3

Figure 15 is a detailed side elevation partly broken away of the batter applying structure.

Figure 16 is a fragmentary sectional view taken on the line 16—16 of Figure 15.

Figure 17 is a fragmentary sectional view similar to Figure 16 on an enlarged scale.

Figure 18 is a plan view partly in horizontal section of the meal applying device.

Figure 19 is a fragmentary sectional view taken on the line 19—19 of Figure 18.

Figure 20 is a fragmentary sectional view taken on the line 20—20 of Figure 18.

Figure 21 is a horizontal section taken on the line 21—21 of Figure 19.

Figure 22 is a fragmentary sectional view taken on the line 22—22 of Figure 21.

Figure 23 is a fragmentary side elevation partly broken away and in section of one of the air circulating nozzles.

Figure 24 is a fragmentary sectional view taken on the line 24—24 of Figure 23.

Figure 25 is a bottom plan view of one of the air circulating nozzles.

Figure 26 is a fragmentary sectional view taken on the line 26—26 of Figure 18.

Figure 27 is a fragmentary vertical section showing the method of releasing the frozen shrimp after the pinning racks with the shrimp have been removed from the refrigerating or freezing zone.

Figure 28 is a perspective view partly broken away of a food package produced according to this method and apparatus.

Referring to the drawings and first to Figure 1 the numeral 30 designates generally a cleaning zone which may be of conventional construction wherein the shrimp are initially cleaned with the shells removed and the bodies of the shrimp are split lengthwise for a depth sufficient to provide for removing the vein. The shrimp are maintained in as cool a condition as possible during all of the steps embodied in this invention and after the shrimp have been completely cleaned and at least partially graded as to size the shrimp are taken to a pinning zone generally designated as 31. In the pinning zone the individual shrimp are pinned to pinning bars as will be hereinafter described and the bars inserted in pinning racks. The pinned shrimp which are suspended from the pinning bars are then passed through a dipping zone generally designated as 32. In the dipping zone the racks containing the suspended shrimp are moved over a batter or liquid pan so that the suspended shrimp will dip into the liquid contained in the batter pan and after passing through the batter pan the pinning racks are elevated so that excess batter will be drained back into the batter pan. In this manner a very substantial economy is effected in the batter or liquid used for coating the shrimp, and the shrimp will be quite evenly coated with the liquid so that when the shrimp are passed through the meal coating zone generally designated as 33 the coating will be effected evenly about the shrimp.

When the shrimp have been coated with meal the pinning racks are placed on mobile rack members 34 and these rack members are then moved into a freezing or refrigerating zone 35. The freezing zone is of such a characteristic as to provide for very quick freezing of the coated or breaded shrimp, and when the shrimp are solidly frozen the racks 34 are removed from the freezing zone and disposed in a position for removal of the racks to the releasing zone 36. In the releasing zone as will be more specifically set forth hereinafter the shrimp are released from the pinning bars and at this time the solidly frozen shrimp may, if desired, be shifted to the boxing and sizing zone 37 where the shrimp are individually placed in shipping containers or boxes. The shrimp boxed in solidly frozen condition may then be placed in the refrigerated storage zone 38.

Referring now to Figures 2 to 11, inclusive, the numeral

4

40 designates generally a frame structure designed for use in providing for the pinning of the shrimp on the pinning bars and the placement of the pinning bars in the bar racks. The frame structure 40 embodies a plurality of upright supporting bars 41 connected together at their lower ends by connecting bars 42. The frame structure 40 also includes lower connecting bars 43 and intermediate connecting bars 44. A pair of angle shaped guide rails 45 are secured to the upright bars 41 between the upper and lower ends thereof and provide a means for removably supporting one or more drip pans 46. An upper pair of angle shaped guide rails 47 are secured to the upper ends of the upright bars 41 and a pair of pinning racks or frame members 48 movably engage on the upper rails 47. A shrimp pan or partition member 49 is supported in offset relation to the frame 40 by means of a pair of outwardly projecting guide rails 50 secured at their inner ends to adjacent upright bars 41 and braced in downwardly and inwardly inclined position by means of bracing members 51.

The pan 49 is formed of opposite side members 52 front and rear walls 53 and 54 and a bottom wall 55. A partition wall 56 is secured between the side walls 52 and partition 56 is formed with a plurality of lower openings 57 so that any liquids may drain downwardly and inwardly with respect to the frame 49. The rear wall 54 is also formed with a plurality of openings 58 so that the liquids may drain from the pan 49 into the pan 46. A pair of upright supporting bars 59 are secured to the guide bars 50 adjacent the inner portions thereof and each supporting bar 59 has secured to the inner side thereof a U-shaped supporting member or bracket 60. The inner wall 61 of each bracket 60 is formed with a slot 62 within which the adjacent end of a pinning bar generally designated as 63 is adapted to removably engage. The rack or supporting member 60 is disposed on an angle to the vertical so that the pinning bar 63 will also be disposed on an angle to the vertical, the purpose for which will be hereinafter described. Each pin bar as shown in Figures 7 to 10, inclusive, includes an elongated flat bar 64 which has projecting upwardly from the lower edge thereof a plurality of spaced apart shrimp supporting pins 65. The pins 65 are secured to the bar 64 by initially forming upwardly projecting slots 66 in the bar 64 with the upper end of each slot inclined to the vertical as shown in Figures 8 and 9. The pin 65 is then inserted in a slot 66 and the walls of the slot 66 are then constricted as indicated at 67 in Figure 10. The constriction of the walls of the slot 66 is accomplished by pressure on each side of the slot, and in order to prevent deforming or bending of the bar 64, the bar 64 adjacent the upper edge thereof is formed with detents 68. Each end of the bar 64 is cut out at the lower edge thereof as indicated at 69 the purpose for which will be hereinafter described. The bar frame or rack 48 is adapted to receive the pinning bars 64 after the shrimp have been inserted on the pins 65. The bar rack 48 comprises a pair of parallel channel bars 70 which are connected together by connecting angle bars 71. The inner wall of each channel member or U-shaped bar 70 is formed with a plurality of spaced apart vertically disposed slots 72 within which the adjacent ends of the bars 64 are adapted to removably engage. When the bars 64 are disposed in the slots 72 the upper edges of the bars 64 will be substantially flush with the upper edges of the channel bars 70.

In practice as shown in Figures 2 and 4 there are two pin bar supporting positions on each side of the frame 40 so that two people may pin the shrimp. After a bar 64 has been filled with shrimp the bar is inserted in the bar rack or frame 48, and when all of the slots 72 have been filled the rack or frame 48 is shifted laterally or to the left as viewed in Figure 2 and an empty frame 48 is placed between the pinning apparatus hereinbefore described.

The positioning of the pinning bars 64 on an angle to the vertical provides for positioning the pins 65 in substantially a vertical position at the time the shrimp are being placed on the pins. The pins 65 are disposed on an oblique angle with respect to the adjacent face of a bar 64 in order to facilitate the subsequent removal of the frozen shrimp from the pins as will be hereinafter described. When a rack 48 has been filled with pinning bars 63 having shrimp suspended therefrom the rack 48 is shifted to the dipping zone 32. The dipping zone comprises a frame structure generally designated as 73 which is formed of upright supporting bars 74 connected together by longitudinal bars 75 at the lower ends of the latter, and the bars 75 on each side of the frame 73 are connected together by lower connecting bars 76.

A pair of horizontally disposed guide rails 77 are secured on the inner sides of the upright bars 74 and the rails 77 are adapted adjacent one end portion of the frame 73 to have a batter pan 78 disposed thereon. A second pair of guide rails 79 are secured to the upper ends of the uprights 74 and the rails 79 which are positioned above the rails 77 include downwardly and inwardly inclined end members 80 merging with horizontal intermediate members 81. The horizontal intermediate members 81 are positioned closely adjacent the upper edge of the batter pan or reservoir 78, and the forward ends of the horizontal rail members 81 merge into upwardly and forwardly inclined rail members 82. The forward ends of the rail members 82 merge into horizontal upper rail members 83. A drip or drain plate 84 is fixed between certain of the uprights 74 forwardly of the pan 78 being disposed substantially parallel with the rails 82 and the rear or inner end of the drain plate 84 overlies the adjacent forward end of the pan 78 so that the batter or coating liquid which drips from the suspended shrimp being moved upwardly over the rails 82 will drain back into the batter pan 78.

The rails 77 in addition to removably supporting the batter pan 78 provide a means for supporting one or more drip pans 85 which are positioned below the upper rail members 83 and at least partially below the drain plate 84. The batter pan or reservoir 78 is formed of opposite side walls 86 and a bottom wall 87. The side walls 86 are formed with reduced end portions 88, and the bottom wall 87 is formed with upwardly divergent end members 89. The divergent bottom walls 89 are positioned adjacent the inclined rails 80 and the inclined rails 82 so that a smaller quantity of batter will be disposed adjacent the end portions of the pan 78 and the major portion of the batter or the batter of greatest depth will be disposed below the horizontal rail members 81. The pin bar racks are placed initially on the downwardly and inwardly inclined rails 80 and then moved downwardly and forwardly over the horizontal rail members 81 so that the suspended shrimp will pass through the batter in the batter pan 78. The pin bar rack members will move over the batter and the tail portions of the shrimp will not be submerged or pass through the batter inasmuch as the tail portions are considered the non-edible portions of the shrimp.

The rack bars 48 are moved forwardly over the horizontal rails 81 and then upwardly over the rails 82, the batter dripping from the shrimp when the shrimp emerge from the batter in the pan 78. The dripping batter will contact the downwardly and inwardly inclined drain plate 84 and will flow back into the batter pan 78. The pin bar frames are moved additionally forward until they rest on the horizontal rail members 73 and these bar frame members may be left on the horizontal rail members 83 for a short time to provide for additional draining of the batter from the suspended shrimp.

Referring now to Figures 18 to 26, inclusive, there is disclosed a meal applying device for applying meal such as cracker or bread crumbs to the batter coated shrimp which are disposed in suspension in the pin rack frames. The mealing device comprises a housing generally designated as 90 which is formed of front and rear walls 91 and 92, respectively, and opposite side walls 93 and 94.

The housing 90 also includes a top wall 95 and a truncated or frusto-pyramidal bottom 96. A pair of angle shaped guide rails 97 are secured to the inner sides 93 and 94 of housing 90 being positioned at a point below the top wall 95 and a pin rack frame 48 is adapted to be removably mounted on the rails 97.

A hinged closure 98 is carried by the front wall 91 and includes a screen or filter 99 so that air circulating within the housing 90 as will be hereinafter described may be exhausted from the housing 90. The housing 90 is supported by means of a plurality of legs 100, and the top wall 95 has secured to and extending upwardly therefrom an air manifold 101. A plurality of air nozzles 102 are disposed within the housing 90 below the top wall 95 and are connected with the manifold 101 by means of tubes 103. The tubes 103 as shown in Figure 26 extend through glands 104 carried by the top wall 95 so that the nozzles 102 may be vertically adjusted with respect to the pin rack frame 48.

There are a plurality of the air nozzles 102 disposed through the top wall 95 and positioned closely adjacent the side walls 93 with the nozzles 102 in a position to be disposed slightly above the pin rack frame 48 and above the spaces between the ends of the pin bars 63 so that the meal which is circulating within the housing 90 will be blown out of the pockets between pairs of pin bars 63 and the channel members 70. A series of front and rear nozzles 102a are disposed within the housing 90 adjacent the front and rear in a position to direct air under pressure onto the angle shaped connecting bars 71 so as to blow the granular on comminuted material off the angle members 71. The nozzles 102a are connected with the manifold 101 by tubes 105, and the manifold 101 has connected with the top 106 thereof a manually operable regulating valve 107. The valve 107 is connected with an air pressure supply pipe 108 so that air under pressure may be directed to the interior of the housing 90 about the marginal portions of the pin rack frame 48. The truncated pyramidal bottom 96 forms a meal reservoir 109 within which cracker or bread crumbs are adapted to be positioned and the meal within the reservoir 109 is circulated or blown about the interior of the housing 90 by means of a downwardly directed nozzle 110.

The nozzle 110 is disposed substantially centrally of the housing 90 being positioned below the guide rails 97 and is connected to a pipe or tube 111 which extends through the rear wall 92 of the housing and is connected to a regulating valve 112 which is manually operable and is connected to the central branch 113 of a T-coupling 114 which is interposed between the pressure pipe 108 and the valve 107. By providing the two regulating valves 107 and 112, the air discharged from the nozzles 102 and 102a may be more or less than the air discharged from the nozzle 110 so as to provide for the proper circulation of air and meal within the housing 90 in order that the meal carried by the air stream or streams will adhere to the coated shrimp which are disposed in suspension within the housing 90.

As shown in Figures 23, 24, and 25 the nozzles 102 102a, and 110 are of similar construction and are formed by flattening the tube so as to form a flared end with a narrow discharge opening and the narrow sides of the nozzle are then also formed with a pair of slots 115 so that the air discharged from each nozzle will not only be downwardly directed, but will also be laterally directed, the lateral direction being caused by the slots 115.

After the shrimp have been coated with the meal the pin rack frame 48 is removed from the housing 90 and is placed on a mobile rack or carrier 34 and when the carrier 34 is filled with racks containing coated shrimp the rack 34 is rolled into a freezer 35. The freezer 35 is of conventional construction and includes a blower for circulating the cold air within the freezer housing. In practice the temperature of air within the freezer 35 is regulated down to temperature of less than zero degrees F., preferably to a temperature of −60° F. at which temperature the suspended shrimp which are suspended in spaced relation one to another will freeze solidly within the period of substantially a very few minutes.

When the shrimp have been solidly frozen the carrier 34 is removed from the freezer 35 and shifted to the shrimp releasing zone. The releasing zone 36 includes a tray 116 disposed on a table 117 and each rack 48 is removed from the carrier 34 and the suspended and now frozen shrimp are disposed within the tray 116. A pair of wooden strips 118 are disposed over the upper edges of the pin bars 63 at the ends of the latter and partially overlie the upper edges of the channel members 70. The rack or frame 48 is then given a circular movement with the shrimp positioned in contact with the bottom of the tray 116 and by reason of the formation of the pin bars 63 from aluminum, the room temperature will be quickly communicated to the pin bars 63 and the tails of the shrimp which may be frozen to the adjacent face of the pin bar will be quickly loosened. This loosening of the tails from the pin bars will be effected before any melting or softening occurs to the frozen bodies of the shrimp. The trays 116 may then be placed in the storing zone 38 for subsequent placement in a carton or container 119.

At the time the shrimp are placed in the carton or container 119 the shrimp which are separate one from the other may be properly sized and by reason of the solid frozen condition of the shrimp the shrimp will not stick together when placed in the carton or container 119. After the container 119 has been filled the filled container is placed in a cold storage so that no melting will occur prior to the subsequent removal of the shrimp from the container. When it is desired to cook the frozen shrimp the shrimp may be readily removed one by one from the container 119 without causing any melting of the frozen condition of the other shrimp and each frozen shrimp may be dropped into a hot cooking liquid wherein the initial high temperature of the cooking liquid will cook and seal the frozen shrimp within the bread coating. This initial sealing of the outer surface of the shrimp will have the effect of retaining the fresh characteristics of the shrimp so that the cooked shrimp will have the palatability of the shrimp cooked immediately after removal from the water.

It is found in practice that the frozen shrimp may be thoroughly cooked in a hot liquid within a period of three or four minutes and this condition permits institutions to provide an improved quality to the shrimp and eliminates any wastage which is normally caused by deterioration or decomposition of shrimp removed from what has heretofore been known as frozen pack wherein the shrimp are frozen together in layers.

What is claimed is:

The method of preparing and packaging frozen shrimp which includes suspending unfrozen shrimp in spaced-apart relation, passing the suspended shrimp through a batter coating to thereby coat the major portion of each shrimp, disposing the suspended shrimp in an air stream containing comminuted meal coating particles whereby the coating particles will adhere to the batter coating to thereby encase the shrimp, disposing the shrimp in spaced-apart suspension in a frigid air-stream to thereby individually freeze each shrimp, and disposing said individually frozen shrimp in a container in contacting non-adhering relation.

References Cited in the file of this patent

UNITED STATES PATENTS

| | | |
|---|---|---|
| 2,134,295 | Zarotschenzeff | Oct. 25, 1938 |
| 2,141,887 | Thomas | Dec. 27, 1938 |
| 2,151,967 | Hedreen et al. | Mar. 28, 1939 |
| 2,329,226 | Stafford et al. | Sept. 14, 1943 |
| 2,329,472 | Koonz | Sept. 14, 1943 |
| 2,344,855 | Dorfan | Mar. 21, 1944 |
| 2,374,452 | Noyes | Apr. 24, 1945 |
| 2,451,391 | Kech | Oct. 12, 1948 |
| 2,493,754 | Dorfan | Jan. 10, 1950 |
| 2,501,655 | Altenburg | Mar. 28, 1950 |
| 2,600,627 | Envoldsen | June 17, 1952 |

FOREIGN PATENTS

| | | |
|---|---|---|
| 321,117 | Great Britain | Oct. 31, 1929 |

OTHER REFERENCES

"The Freezing Preservation of Foods," 1943, by D. K. Tressler, published by The Avi Publishing Company, Inc., New York, page 55.

"The Good Housekeeping Cook Book," 1949, by D. B. Marsh, published by Rinehart and Company, Inc., New York, page 289, article entitled "Fried Oysters," and page 293, article entitled "Fried Shrimp."

"Quick Frozen Foods," February 1950, page 181.